US006453856B1

United States Patent
Lehmann et al.

(10) Patent No.: US 6,453,856 B1
(45) Date of Patent: Sep. 24, 2002

(54) METHOD FOR THE LOAD-CONTROLLING OPERATION OF ELECTROMAGNETICALLY ACTIVATED INTAKE VALVES OF AN INTERNAL COMBUSTION ENGINE

(75) Inventors: Hans Jörg Lehmann, Regensburg; Claus Rose, Köfering; Thomas Vogt, Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/013,254

(22) Filed: Dec. 10, 2001

Related U.S. Application Data

(63) Continuation of application No. PCT/DE00/01887, filed on Jun. 9, 2000.

(30) Foreign Application Priority Data

Jun. 10, 1999 (DE) .......................... 199 26 506

(51) Int. Cl.⁷ .............................................. F02D 13/02
(52) U.S. Cl. ................................ 123/90.11; 123/90.15; 123/432
(58) Field of Search ....................... 123/90.11, 90.15, 123/90.16, 90.17, 308, 432

(56) References Cited

U.S. PATENT DOCUMENTS

| 4,700,684 A | * 10/1987 | Pischinger et al. ......... 123/568 |
| 5,669,341 A | 9/1997 | Ushirono et al. ........ 123/90.11 |
| 6,182,621 B1 | * 2/2001 | Salber et al. ............ 123/90.15 |

FOREIGN PATENT DOCUMENTS

| DE | 38 35 333 A1 | 4/1990 |
| DE | 39 26 423 A1 | 2/1991 |
| DE | 43 00 666 A1 | 7/1993 |
| DE | 43 41 945 A1 | 2/1995 |
| DE | 195 26 848 A1 | 1/1997 |
| DE | 196 10 468 A1 | 2/1997 |
| DE | 196 49 466 A1 | 6/1998 |
| EP | 0 433 632 A1 | 6/1991 |

* cited by examiner

Primary Examiner—Weilun Lo
(74) Attorney, Agent, or Firm—Laurence A. Greenberg; Werner H. Stemer; Ralph E. Locher

(57) ABSTRACT

In order to be able to implement low loads at high rotational speeds in an internal combustion engine with electromagnetically activated intake valves, one intake valve of a cylinder is operated in the free flying phase, i.e. not held in the open position, and the other intake valve of the cylinder is correspondingly opened for a longer time. Alternatively, the first valve can also be held closed.

2 Claims, 4 Drawing Sheets

FIG 3
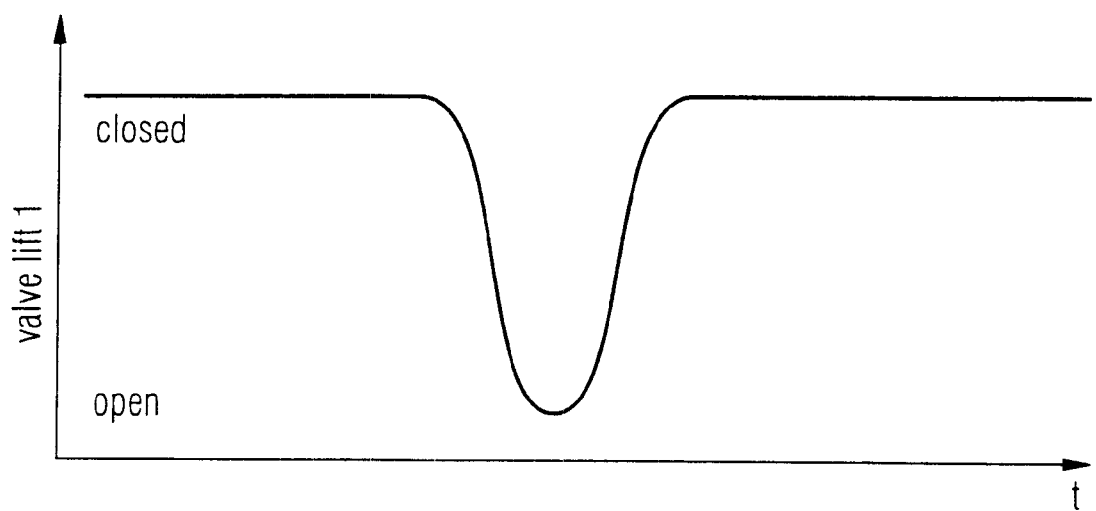
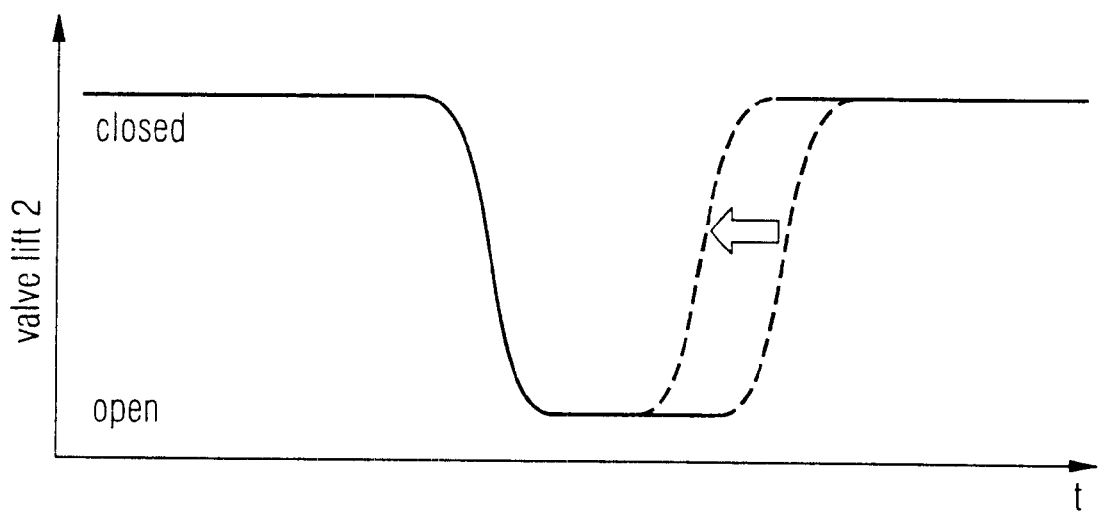

METHOD FOR THE LOAD-CONTROLLING OPERATION OF ELECTROMAGNETICALLY ACTIVATED INTAKE VALVES OF AN INTERNAL COMBUSTION ENGINE

CROSS-REFERENCE TO RELATED APPLICATION

This application is a continuation of copending International Application Ser. No. PCT/DE00/01887, filed Jun. 9, 2000, which designated the United States.

BACKGROUND OF THE INVENTION

FIELD OF THE INVENTION

The invention lies in the internal combustion technology field and relates, more specifically, to a method for the load-controlling operation of electromagnetically activated charge cycle valves of an internal combustion engine which has two intake valves per cylinder.

Internal combustion engines whose charge cycle valves are activated electromagnetically are known. In contrast to cam shaft-actuated valves, these valves are actuated to open and close in dependence on the rotational position of the crank shaft; there is no fixed mechanical coupling to the crank shaft. Electromagnetic actuators for charge cycle valves are known, for example, from German patent application DE 196 10 468 A1. They have an idle position which is located between a closed position and an open position and in which they are held by two springs and out of which they can be deflected by means of electromagnets.

By energizing one of the electromagnets, the valve can be protracted into the respective end position associated with the electromagnet and held there. In order to move the valve from one end position into the other, the energization of the holding electromagnet is terminated and the other electromagnet is energized, as a result of which the valve moves into the other end position under the force of the springs and of the switched-on electromagnet. The charge cycle valve and the actuator constitutes, together with the springs, a spring-mass oscillator. Its natural frequency or resonant frequency is decisive for the speed at which the valve can be moved between the end positions. These physical conditions define a minimum actuating time from one end position to the other, which cannot be shortened beyond a predefined degree within the scope of the technical possibilities (for example available space for the actuator on the cylinder head of an internal combustion engine).

Such an electromagnetic charge cycle valve activation system has the advantage that in the case of a spark-ignition internal combustion engine with mixture induction the load control can be effected directly by controlling the activation of the intake valves, at least in a wide load range. However, in this context there is the problem that at high rotational speeds the physically predefined minimum achievable actuation times are too long for operation with low loads, that is to say with small torque values of the internal combustion engine.

In this respect, German patent application DE 196 10 468 A1 discloses that the opening lift of the intake valve of a cylinder is reduced by moving the valve out of the closed position in the direction of the open position only for a brief time and then adjusting it back into the closed position without having reached the other end position. This results in a smaller flow passage being opened than when the valve is fully opened.

However, this procedure has the disadvantage that the closing electromagnet is heavily loaded because it has to bring about a reversal of the valve which is pressed into the open position by the springs. This is aggravated by the fact that as a rule the current through the respective electromagnet is higher in the capture phase than in the holding phase in which the valve is held in the end position.

Moreover, a further difficulty arises owing to what is referred to as "sticking" of the actuator in an end position. This is caused by the finite decay time of the magnetic field at a holding electromagnet, the result of which is that when an electromagnet is actuated a certain minimum holding period cannot be undershot.

German patent application DE 196 10 468 A1 and European patent application EP 0 443 632 A also disclose that during partial load operation one of the intake valves is held closed while the other intake valve supplies the cylinder with the necessary air mass flow rate. However, this way of operating the intake valves is unsatisfactory if a single intake valve is not sufficient for correct charging of the cylinder. Moreover, the difficulties brought about by the "sticking" of the actuator also occur in this case.

SUMMARY OF THE INVENTION

It is accordingly an object of the invention to provide a method for load-control driving of the electromagnetic intake valves of an internal combustion engine, which overcomes the above-mentioned disadvantages of the heretofore-known devices and methods of this general type and which permits load control of the internal combustion engine during partial load operation, in particular at high rotational speeds, without the closing electromagnet being overloaded or the "sticking" of an actuator having disadvantageous effects, in which case in particular small loads are to be achievable.

With the foregoing and other objects in view there is provided, in accordance with the invention, a method for a load-control operation of electro-mechanically activated charge cycle valves of an internal combustion engine having at least one cylinder with a first intake valve and a second intake valve, the method which comprises the following method steps, to be performed during a partial load operation:

moving the first intake valve, in a free oscillation process, from a closed position and into a maximum open position and back into the closed position during an opening operation, substantially without being held in the maximum open position, resulting in an opening period of the first intake valve shorter than an average opening period that would be necessary with an identical method of operation of both intake valves for a respective load during the partial load operation; and moving the second intake valve from a closed position into a maximum open position, holding the second intake valve in the maximum open position, and moving the second intake valve back into the closed position during an opening operation, resulting in an opening period for the second intake valve greater than the average opening period;

whereby a combination of the opening periods of the first and second intake valves results in an overall opening period necessary for the respective load during partial load operation.

In other words, in an internal combustion engine with two intake valves the first intake valve is activated in such a way that it carries out what is referred to as "free flying". In this process, the valve is adjusted from the closed position into the open position and back without the electromagnet being actuated for the opening operation. It therefore reaches the open end position, but is not held there. This results in an opening period of this first intake valve which is shorter than the opening period necessary for the partial load operation to be processed. This too short opening period is compensated by the fact that the second intake valve is opened for a longer time than is actually necessary, the electromagnet being activated for the opening operation and the valve therefore being held in the open position.

This concept according to the invention makes it possible for the range, which is normally not accessible, between the valve opening period which results during "free flying" and the minimum opening period which is limited by the "sticking time" can be halved. As a result, at relatively high rotational speeds significantly smaller loads can be achieved, and significantly higher rotational speeds can be achieved for a given load.

In accordance with a concomitant feature of the invention, the first and second valves are interchanged from one combustion cycle to the next. This prevents fuel which is injected before the two intake valves from collecting permanently before a closed valve or a valve which is actuated only for a short time. As a result of the alternating operation of the intake valves, a jump in the fuel/air ratio of the cylinder is prevented.

Other features which are considered as characteristic for the invention are set forth in the appended claims.

Although the invention is illustrated and described herein as embodied in a method for the load-controlling operation of electromagnetically activated intake valves of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows two travel curves of two intake valves, one being operated in free flying mode.

DESCRIPTION OF THE PREFERRED EMBODIMENTS

Figure 1:
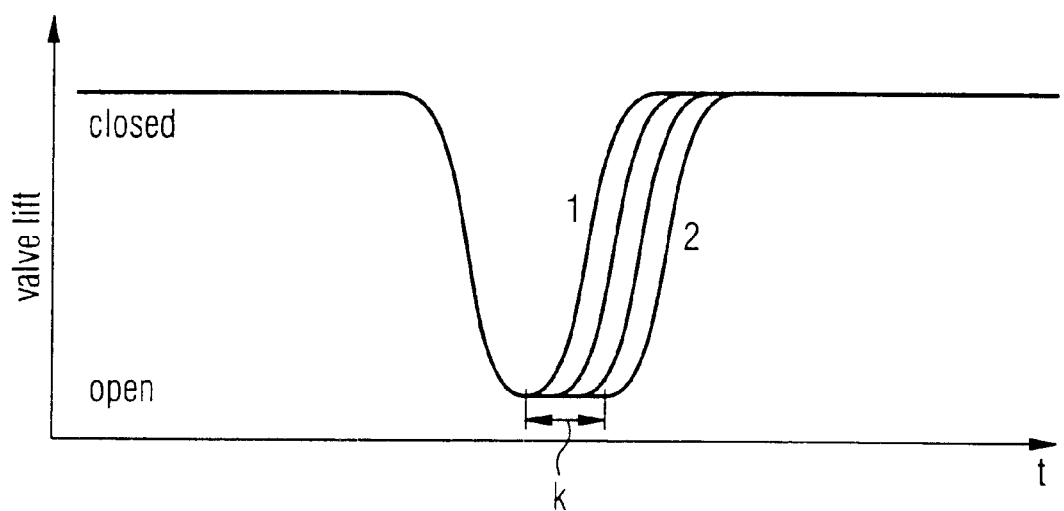
FIG. 1 is a graph showing two travel curves of a valve lift illustrating the sticking time.

An internal combustion engine having two electromagnetically actuated intake valves such as they are known, for example, from the above-cited German patent application DE 196 10 468 A1, is controlled in terms of its load by the actuation of the charge cycle valves. At high rotational speeds and low loads, the intake valves can be opened only for a short time. FIG. 2 shows the travel curves of an electromagnetically actuated valve. The valve lift is plotted on the x-axis and the time t on the y-axis. The valve is moved to and fro between a closed position, which is designated as closed in FIG. 1 and an open position which is designated as open. In the case of curve 1, the valve is held in the open position for as short a time as possible. In the case of curve 2, there is no holding in the open position. A continuous transition between curves 1 and 2 is not possible, and the curves which are plotted in FIG. 1 by dashed lines cannot be obtained. This is due to the fact that the magnetic field on the electromagnet which holds the valve in the open position has a finite decay time. If the actuation of the electromagnetic intake valve is switched over from curve 2 to curve 1, this results in a jump in the opening period, which is illustrated by the time period k in FIG. 1.

The steepness of the opening profile or closing profile is physically permanently predefined by the resonant frequency of the spring-mass oscillator which the electromagnetically activated charge cycle valve represents.

If an internal combustion engine is operated at high rotational speeds with a low load, the two intake valves of each cylinder are operated with the travel curves illustrated in FIG. 2. Here, valve lift 1 designates the valve lift of the first intake valve and valve lift 2 designates the valve lift of the second intake valve. If the internal combustion engine is then to be operated with an even lower load or at an even higher rotational speed, the closing of the intake valves is displaced on the time axis in the direction of the illustrated arrows. However, this is not continuously possible owing to the problems described with reference to FIG. 1.

For this reason, as illustrated in FIG. 3, the first intake valve is adjusted to free-flying mode, which represents a stable operating point for this valve. The opening area of the intake valves which is lost as a result of this is compensated by the second valve, which carries out a jump toward larger loads or to a longer valve opening period, as illustrated by the left-hand dashed valve lift 2. This ensures that the internal combustion engine overall takes in precisely the same amount of air as before. In order then to reduce the load further or to increase the rotational speed further, it is possible, by shortening the valve opening period of the second valve, to reduce the load further until said valve comes up to its sticking limit, which is illustrated by the valve lift 2 represented by a dashed line on the left.

Figure 4:
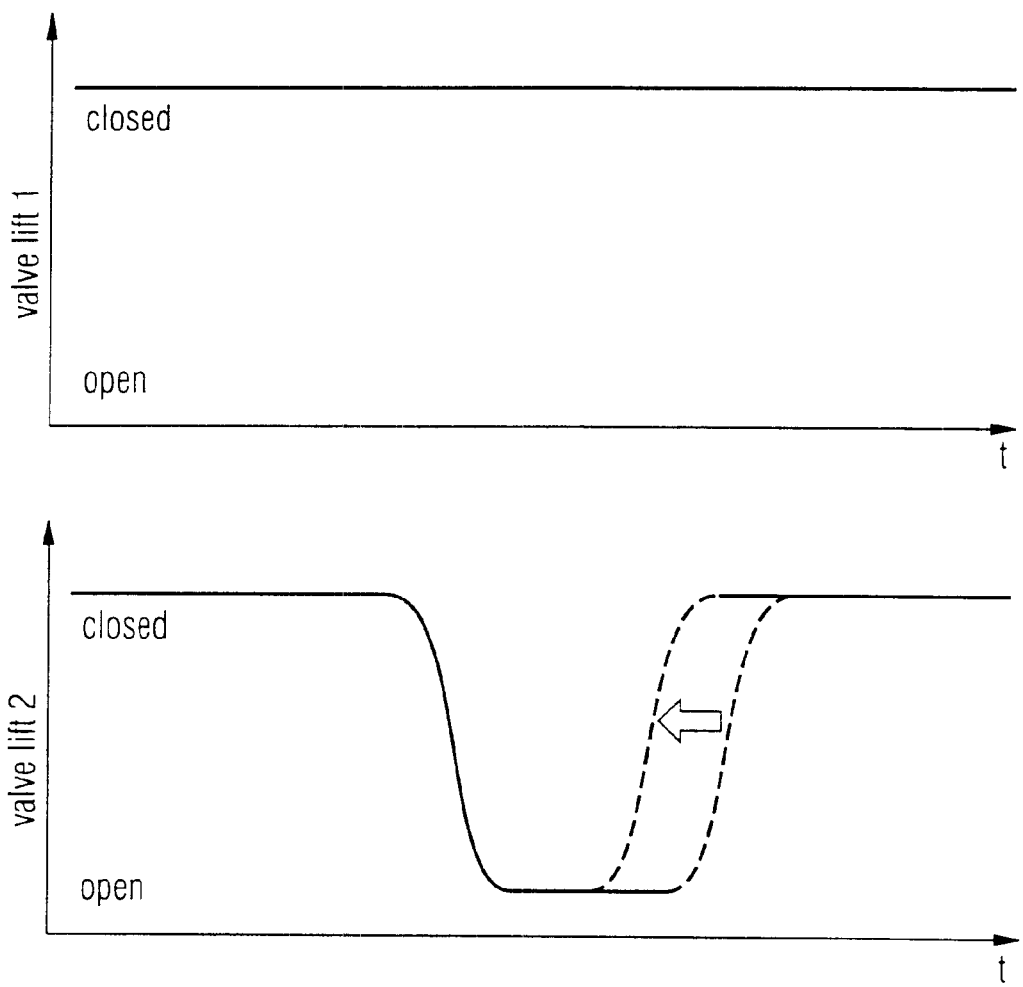
FIG. 4 shows two travel curves of the valve lift of two intake valves, one intake valve being held in a closed position.

If a further reduction of the load or a further increase in the rotational speed is required, a valve is no longer activated, as illustrated in FIG. 4, and the valve lift 1 remains constantly closed. In the process, the opening period of the second valve in turn jumps in the direction of longer valve opening periods in order to compensate the opening area which has been lost, which is illustrated by the valve lift 2 represented by a dashed line on the right. The load of the internal combustion engine or the opening period of the second valve can then be reduced further until this valve reaches its sticking limit again, which limit is illustrated by valve lift 2 represented by a dashed line on the left.

Figure 2:
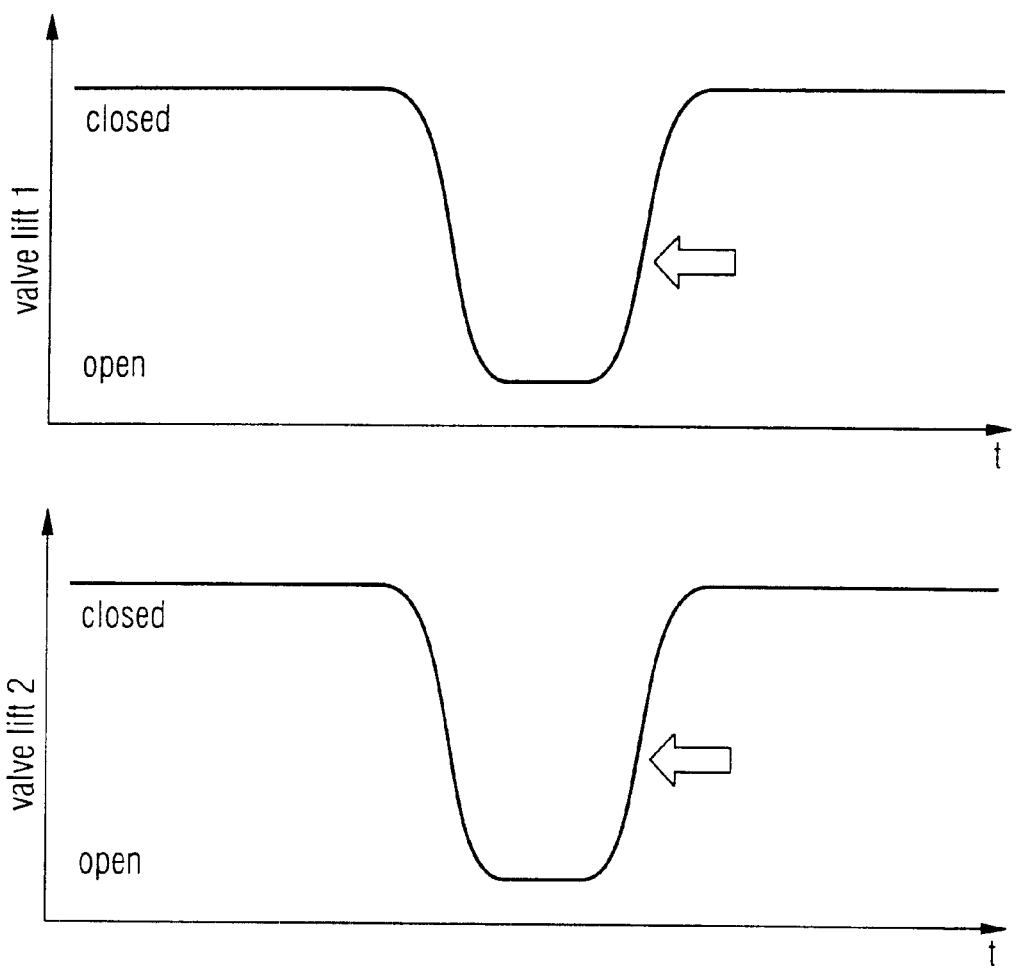
FIG. 2 shows two travel curves of two intake valves during partial load operation at high rotation speeds.

Overall, the inaccessible range for the opening of the valve, illustrated by k in FIG. 1, has thus been halved. Or in other words, the linear range has doubled.

As a result of the fact that electromagnetically actuated valves provide the possibility of opening and closing each individual valve at any desired point, it is possible to implement the described jumps in the control times of the valves.

In internal combustion engines with intake manifold injection, the fuel is injected upstream of the two intake valves. If a valve, in the description above the first valve with the valve lift 1, is not actuated or is actuated for a significantly shorter time than the other one, fuel can collect before this valve, which signified a jump in the lambda number or in the fuel/air ratio of this cylinder. In order to avoid this, the valves are operated alternatively, i.e. there is a constant alternation between the first valve and the second valve. This means one valve alternately completely carries out the valve lift, which is designated as valve lift 1 in the Figs., and in a later combustion cycle carries out the valve lift which is designated by valve lift 2.

As a result of this method, the restrictions when tuning an internal combustion engine are loosened because a linear adjustment of the load of the internal combustion engine is proportional to the valve opening area (area plotted over the travel curve) can be brought about in a wider range. At the same time, the requirements made of the shortness of the flying times, i.e. the steepness of the opening or of the closing are loosened because otherwise it would not be possible to construct electromagnetically activated valves which exhibit faster opening and closing behavior. However, this would be extremely difficult in structural terms against the background of the peripheral requirements relating to installation space and fabrication costs.

We claim:

1. A method for a load-control operation of electromechanically activated charge cycle valves of an internal combustion engine having at least one cylinder with a first intake valve and a second intake valve, the method which comprises the following method steps, to be performed during a partial load operation:

moving the first intake valve, in a free oscillation process, from a closed position and into a maximum open position and back into the closed position during an opening operation, substantially without being held in the maximum open position, resulting in an opening period of the first intake valve shorter than an average opening period that would be necessary with an identical method of operation of both intake valves for a respective load during the partial load operation; and moving the second intake valve from a closed position into a maximum open position, holding the second intake valve in the maximum open position, and moving the second intake valve back into the closed position during an opening operation, resulting in an opening period for the second intake valve greater than the average opening period;

whereby a combination of the opening periods of the first and second intake valves results in an overall opening period necessary for the respective load during partial load operation.

2. The method according to claim 1, which comprises interchanging the first and second intake valves in terms a method of operation thereof from one combustion cycle to a next so that the second intake valve has the short opening period and the first intake valve has the longer opening period.

* * * * *